(12) United States Patent
Garg et al.

(10) Patent No.: US 12,730,591 B2
(45) Date of Patent: Sep. 8, 2026

(54) SYSTEMS AND METHODS FOR STORAGE BASED MONITORING OF MEMORY ACCESSES

(71) Applicant: Samsung Electronics Co., Ltd., Suwon-si (KR)

(72) Inventors: Mukesh Garg, Stanford, CA (US); Ramzi Ammari, Santa Clara, CA (US); Changho Choi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/139,198

(22) Filed: Apr. 25, 2023

(65) Prior Publication Data

US 2024/0303001 A1 Sep. 12, 2024

Related U.S. Application Data

(60) Provisional application No. 63/451,601, filed on Mar. 12, 2023.

(51) Int. Cl.
*G06F 3/06* (2006.01)

(52) U.S. Cl.
CPC ............ *G06F 3/0671* (2013.01); *G06F 3/061* (2013.01); *G06F 3/0653* (2013.01)

(58) Field of Classification Search
CPC ...... G06F 3/061; G06F 3/0653; G06F 3/0671; G06F 3/0647–0649
See application file for complete search history.

(56) References Cited

U.S. PATENT DOCUMENTS

| | | | | |
|---|---|---|---|---|
| 6,748,487 | B1 * | 6/2004 | Takamoto | G06F 12/122 711/134 |
| 7,865,631 | B2 | 1/2011 | Madruga et al. | |
| 8,060,686 | B2 | 11/2011 | Yeh | |
| 9,542,326 | B1 * | 1/2017 | Throop | G06F 3/061 |
| 10,474,580 | B2 | 11/2019 | Coburn et al. | |
| 10,705,975 | B2 | 7/2020 | Coburn et al. | |
| 11,237,981 | B1 | 2/2022 | Habusha et al. | |

(Continued)

FOREIGN PATENT DOCUMENTS

| | | | |
|---|---|---|---|
| TW | 200925871 | A | 6/2009 |
| TW | 200949539 | A | 12/2009 |
| WO | WO 2022/198552 | A1 | 9/2022 |

OTHER PUBLICATIONS

EPO Extended European Search Report dated Jul. 8, 2024, issued in corresponding European Patent Application No. 24155775.0, 8 pages.

*Primary Examiner* — Chie Yew
(74) *Attorney, Agent, or Firm* — Womble Bond Dickinson (US) LLP

(57) ABSTRACT

Systems and methods for monitoring memory accesses. A storage system comprises a first memory device, a second memory device, and a controller configured to communicate with the first memory device and the second memory device. The controller is configured to: receive, from a computing device, a first request for first data; identify a first address based on the first request; search the first memory device for the first address; modify a first count maintained in the second memory device for the first address; receive from the computing device a second request; and provide the first count in response to the second request.

19 Claims, 6 Drawing Sheets

(56) References Cited

U.S. PATENT DOCUMENTS

| | | | | |
|---|---|---|---|---|
| 11,467,960 | B1 | 10/2022 | Dimond et al. | |
| 2009/0019233 | A1* | 1/2009 | Colglazier | G06F 12/0822 711/141 |
| 2016/0057256 | A1* | 2/2016 | Hara | H04L 69/22 370/474 |
| 2019/0138437 | A1 | 5/2019 | Bennett et al. | |
| 2019/0347034 | A1 | 11/2019 | Hasbun et al. | |
| 2020/0019336 | A1* | 1/2020 | Kachare | G06F 3/0653 |
| 2021/0232312 | A1 | 7/2021 | Prasad et al. | |
| 2021/0374080 | A1* | 12/2021 | Horwich | G06F 12/0891 |
| 2022/0121386 | A1* | 4/2022 | Hsu | G06F 3/0608 |
| 2022/0214825 | A1 | 7/2022 | Ganguly et al. | |
| 2022/0276959 | A1 | 9/2022 | Dong et al. | |
| 2023/0033029 | A1 | 2/2023 | Aguilera et al. | |
| 2023/0044342 | A1 | 2/2023 | Wilkinson | |
| 2024/0070072 | A1* | 2/2024 | Roberts | G06F 12/0815 |
| 2024/0354216 | A1* | 10/2024 | Evans | G06F 12/1027 |

* cited by examiner

| Count | Memory |
| --- | --- |
| 0 | 1-4 |
| 0 | 5-8 |
| 5 | 9-12 |
| 10 | 13-16 |
| 1 | 17-22 |
|  | ⋮ |

FIG. 3

SYSTEMS AND METHODS FOR STORAGE BASED MONITORING OF MEMORY ACCESSES

CROSS-REFERENCE TO RELATED APPLICATION(S)

The present application claims priority to and the benefit of U.S. Provisional Application No. 63/451,601, filed Mar. 12, 2023, entitled "MEMORY COUNTERS IN CXL MEMORY," the entire content of which is incorporated herein by reference. This application is also related to U.S. application Ser. No. 18/139,211, filed Apr. 25, 2023, entitled "SYSTEMS AND METHODS FOR MEMORY REPRESENTATION AND MANAGEMENT," now U.S. Pat. No. 12,481,588, and U.S. application Ser. NoNo. 18/139,236, filed Apr. 25, 2023,entitled "SYSTEMS AND METHODS FOR MEMORY REPRESENTATION AND TRACKING," now U.S. Pat. No. 12,423,229, both filed on even date herewith, the contents of both of which are incorporated herein by reference.

FIELD

One or more aspects of embodiments according to the present disclosure relate to storage systems, and particularly to systems and methods for monitoring memory access.

BACKGROUND

An application may interact with a memory device for reading and writing data. Latencies are generally involved in accessing the memory device. The type of latency involved my depend on the type of storage device included in the memory device. Certain storage devices have lower latencies than other storage devices. Thus, it may be desirable to manage the use of the storage devices for efficient data retrieval.

The above information disclosed in this Background section is only for enhancement of understanding of the background of the present disclosure, and therefore, it may contain information that does not form prior art.

SUMMARY

Embodiments of the present disclosure are directed to a storage system comprising a first memory device, a second memory device, and a controller configured to communicate with the first memory device and the second memory device. The controller is configured to: receive, from a process running on a computing device, a first request for first data; identify a first address based on the first request; search the first memory device for the first address; modify a first count in the second memory device for the first address; receive from the computing device a second request; and provide the first count in response to the second request.

In some embodiments, the first memory device is associated with a first access latency.

In some embodiments, wherein the first memory device is coupled to the computing device over a communication interface.

In some embodiments, the first request includes at least one of a request to load or store the first data.

In some embodiments, the first count is indicative of a number of accesses to the first address.

In some embodiments, the second memory device is configured to maintain a second count for a second address in the first memory device.

In some embodiments, the controller is configured to provide the second count in response to the second request.

In some embodiments, the computing device is configured to: compare the first count to the second count; and cause an action in response to the compare.

In some embodiments, the first count is greater than the second count, and the computing device is configured to maintain second data associated with the second address in the first memory device based on the compare.

In some embodiments, the first count is maintained in association with a process of the computing device, and the second request includes an identifier of the process.

In some embodiments, the controller is further configured to: receive from the computing device a third request from the computing device; and update the first count in response to the third request.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 3 depicts a conceptual layout diagram of a data structure storing one or more access counters according to one or more embodiments;

DETAILED DESCRIPTION

Figure 1:
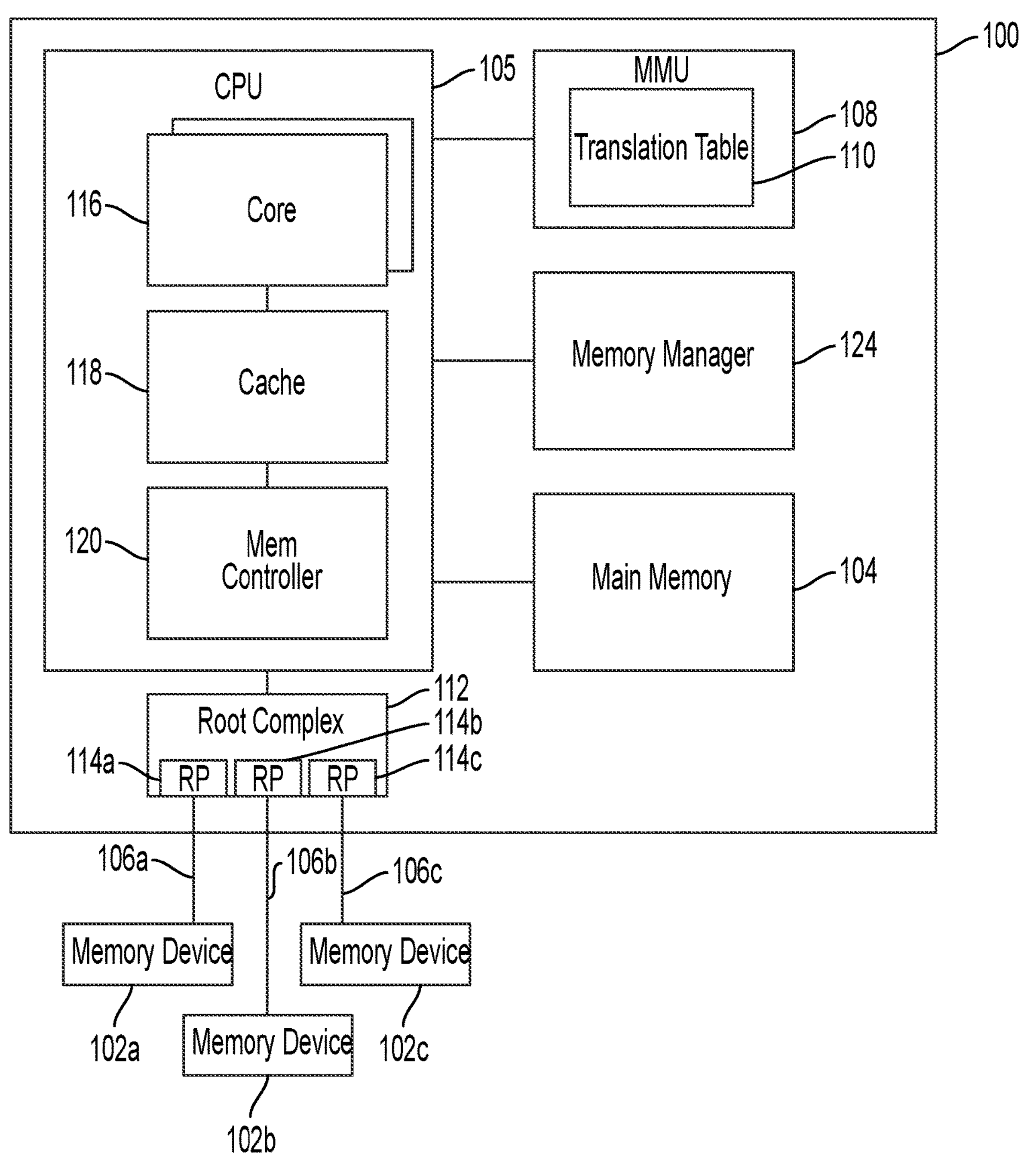
FIG. 1 depicts a block diagram of a system for monitoring memory accesses and making page migration decisions according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

In general terms an application running on a host computing device may need to store and load data to and from a memory device. Latencies are generally involved in accessing the memory device. The latencies involved may differ depending on the type of memory device that is accessed. For example, a memory device that is attached to a central computing unit (CPU) or graphics processing unit (GPU) may have lower latencies than a memory device that is attached to the CPU via an expansion bus (e.g., a Compute Express Link (CXL), remote direct memory access (RDMA), and/or the like). In this regard, the different types of memory devices may be organized in a memory hierarchy or tier where the tier assigned to a memory device may increase as the latency associated with the medium decreases. In this regard, it may be desirable to manage the storage system so that a block, chunk, or page of data (collectively referred to as a "page" or "memory page") that is accessed more often than other memory pages is stored in (or promoted to) a higher memory tier (e.g., main memory of the computing device), and a memory page that is accessed infrequently is stored in (or demoted to) a lower memory tier (e.g., persistent memory).

One or more mechanisms may be used to track access to memory pages. For example, an access bit may be maintained for a page entry in a translation lookaside buffer (TLB) stored in a memory management unit (MMU) of a host computing device. The access bit may indicate whether a page has been accessed ("hot" page) or not accessed ("cold" page). In this regard, the access bits associated with one or more pages may be initialized to 0. When a process wants to access a certain page, a page fault is triggered based on the access bit of the page having a 0 value. The host CPU may set the access bit for the page to "1" in response to the page fault.

The host CPU may use the values of the access bits to determine whether one or more memory pages are hot or cold. Page migration (e.g., promotion or demotion) decisions may be made based on the retrieved values. For example, a page with an access bit of 1 may be deemed to be hot, and promoted to a higher memory tier. A page with an access bit of 0 may be deemed to be cold, and demoted to a lower memory tier.

Retrieving access bit information from the MMU/TLB, however, may consume extra CPU cycles, affecting application performance. For example, when the CPU tries to access a page whose access bit is zero, a page fault may be triggered. Handling a page fault may result in extra CPU cycles (e.g., to save the process context of the running application before exiting, handle the page fault, create an entry in the TLB and/or set the access bit, and restore running of the process).

Use of access bits may also not result in accurate selections of pages that are selected for page migration. That is, setting of an access bit merely indicates that the page has been accessed, but does not indicate a number of times the page has been accessed ("activeness" or "warmness" of the page). Thus, page migration decisions that are based on access bits may be less accurate than page migration decisions based on activeness of pages.

In general terms, embodiments of the present disclosure are directed to systems and methods for monitoring memory access. In some embodiments, at least one of the memory devices includes a counter that maintains a count of memory accesses to a memory location of the memory device. The counter for the memory location may be increased in response to access to the memory location. In some embodiments, a processor included in the memory device may receive a memory access request (e.g., load or store request) from the host computing device. The processor may identify a memory address from the request, and increase the access counter for the memory address. By maintaining a counter in the memory device itself, page access information may be maintained without involvement, for example, of the host CPU.

In some embodiments, the host computing device may retrieve the information in the access counter via a command interface from the memory expander device. The retrieved access information may be used by the host computing device to identify activeness or warmness of one or more memory pages. The host computing device may trigger an action in response to identifying the activeness or warmness. For example, the host computing device may engage in data migration based on page activeness, resulting in better promotion or demotion decisions. For example, one or more most active pages may be moved from the current memory device to another memory device in an upper tier. One or more least active pages, on the other hand, may be moved from the current memory device to another memory device in a lower tier. Other actions may be triggered by the host computing device based on access information retrieved from one or more memory devices, including but not limited to identifying a memory device where to store data and/or making other performance related decisions.

It should be appreciated that the systems and methods for monitoring memory accesses according to one or more embodiments allow for efficient retrieval of activeness (hot, warm, or cold) of a memory page, that does not require use of the host CPU. In addition, the activeness information provides more precise data as to the activeness of a page, allowing better promotion and demotion decisions.

FIG. 1 depicts a block diagram of a system for monitoring memory accesses and making page migration decisions according to one or more embodiments. The system includes a host computing device (referred to as the "host") 100 coupled to a one or more endpoints such as, for example, one or more memory devices 102*a*-102*c* (collectively referenced as 102).

The host 100 includes a processor 105, main memory 104, memory management unit (MMU 108), and root complex (RC) interface 112. The processor 105 may include one or more central processing unit (CPU) cores 116 configured to execute computer program instructions and process data stored in a cache memory 118 (also simply referred to as "memory" or "cache"). The cache 118 may be dedicated to one of the CPU cores 116 or shared by various ones of the CPU cores. It should be appreciated that although a CPU is used to describe the various embodiments, a person of skill in the art will recognize that a GPU may be used in lieu or in addition to a CPU.

The cache 118 may be coupled to a memory controller 120 which in turn is coupled to the main memory 104. The main memory 104 may include, for example, a dynamic random access memory (DRAM) storing computer program instructions and/or data (collectively referenced as data) generated by the memory device 102. In order to execute instruction or data generated by the memory device 102 by a CPU core 116, the data may be loaded into the cache memory 118, and the CPU may consume the data directly from the cache memory. If the data to be consumed is not already in the cache, a cache miss will occur, and a corresponding memory device may need to be queried to load the data. For example, if the data that is sought is not in the cache 118, a cache miss logic may query the data from a corresponding memory (main memory (e.g., DRAM) 104 or memory device 102) based on a mapped virtual or physical address.

In some embodiments, the processor 105 generates requests for the memory devices 102. The requests may include command interface requests to get counter value(s), reset counter value(s), and/or the like. One or more of the requests may be associated with a virtual memory address. In some embodiments, the processor may invoke the MMU 108 to translate the virtual address to a physical address. The MMU 108 may include a translation table 110 that maps virtual addresses to physical addresses. The request transmitted to the memory device 102 may include the physical address corresponding to the virtual address.

In some embodiments, the MMU 108 may include a memory manager 124. The memory manager 124 may be configured with instructions for managing data stored in the cache 118, main memory 104 and/or the memory devices 106 (generally referred to as storage media). In some embodiments, the memory manager 124 is implemented via software, firmware, or hardware, or a combination software, firmware, and/or hardware. The management may include, for example, promotion and demotion of memory pages in and out of the memory device. In this regard, the memory manager 124 may request the memory devices 102 for count values of memory accesses monitored by the memory devices. The memory manager 124 may determine, based on the count information, that one or more pages should be moved from one memory device to another. Additional details of the memory manager 124 is found in U.S. Application entitled "Systems and Methods for Memory Representation and Management," filed on even date herewith, the content of which is incorporated herein by reference.

In some embodiments, the host 100 sends requests to the memory devices 102 via the RC interface 112 and interface connections 106*a*-106*c* (collectively referenced as 106). The requests may include data access requests, memory count information requests, and/or the like. Messages from the memory devices 102 to the host 100, such as, for example, responses to the requests from the host, are delivered over the interface connections 106 to the RC interface 112, which in turn delivers the responses to the processor 105.

In some embodiments, the interface connections 106 (e.g., the connector and the protocol thereof) includes various general-purpose interfaces such as, for example, Ethernet, Universal Serial Bus (USB), and/or the like. In some embodiments, the interface connections 106 (e.g., the connector and the protocol thereof) may include (or may conform to) a Compute Express Link (CXL), Cache Coherent Interconnect for Accelerators (CCIX), dual in-line memory module (DIMM) interface, Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), iWARP protocol, InfiniBand protocol, 5G wireless protocol, Wi-Fi protocol, Bluetooth protocol, and/or the like.

The RC interface 112 may be, for example, a PCIe interface configured to implement a root complex for connecting the processor 105 and host memory 104 to the memory devices 102. The RC interface 112 may include one or more ports 114*a*-114*c* to connect the one or more memory devices 102 to the RC. In some embodiments, the MMU 108 and/or translation table 110 may be integrated into the RC 112 interface for allowing the address translations to be implemented by the RC interface.

The memory device 102 may include one or more of a volatile computer-readable storage medium and/or non-volatile computer-readable storage medium. In some embodiments, one or more of the memory devices 102 include any type of memory that is attached to a CPU or GPU, such as, for example, a CXL attached memory device (including volatile and persistent memory device), RDMA attached memory device, and/or the like, although embodiments are not limited thereto. The CXL attached memory device (simply referred to as CXL memory) may adhere to a CXL.mem protocol where the host 100 may access the device using commands such as load and store commands. In this regard, the host 100 may act as a requester and the CXL memory may act as a subordinate.

In some embodiments, the main memory 104 and/or memory devices 102 may be included in a memory system that allows memory tiering to deliver an appropriate cost or performance profile. In this regard, the different types of storage media may be organized in a memory hierarchy or tier based on a characteristic of the storage media. The characteristic may be access latency. In some embodiments, the tier or level of a memory device increases as the access latency decreases.

In some embodiments, the one or more of the memory devices 102 are memory devices of the same or different type, that are aggregated into a storage pool. For example, the storage pool may include one or more CPU or GPU attached memory devices In some embodiments, a memory page is moved (e.g., promoted or demoted) from one memory tier to another, depending on access characteristics (or activeness) of the memory page. For example, an inactive (e.g., cold) memory page may be demoted from a first memory device (e.g., CXL memory device) to a second memory device (e.g., persistent storage) at a lower tier of the memory hierarchy. In another example, a more active page (e.g., a page with accesses higher than another page) may be promoted from the first memory device (e.g., CXL memory device) to a third memory device (e.g., main memory) at a higher tier of the memory hierarchy.

In some embodiments, one or more of the memory devices include an access counter that maintains a count of accesses to one or more memory locations of the memory device. The access counter may be accessed by the host 100 for determining activeness of a page (e.g., hot, warm, cold). A promotion or demotion decision may be made based on the activeness information.

Figure 2:
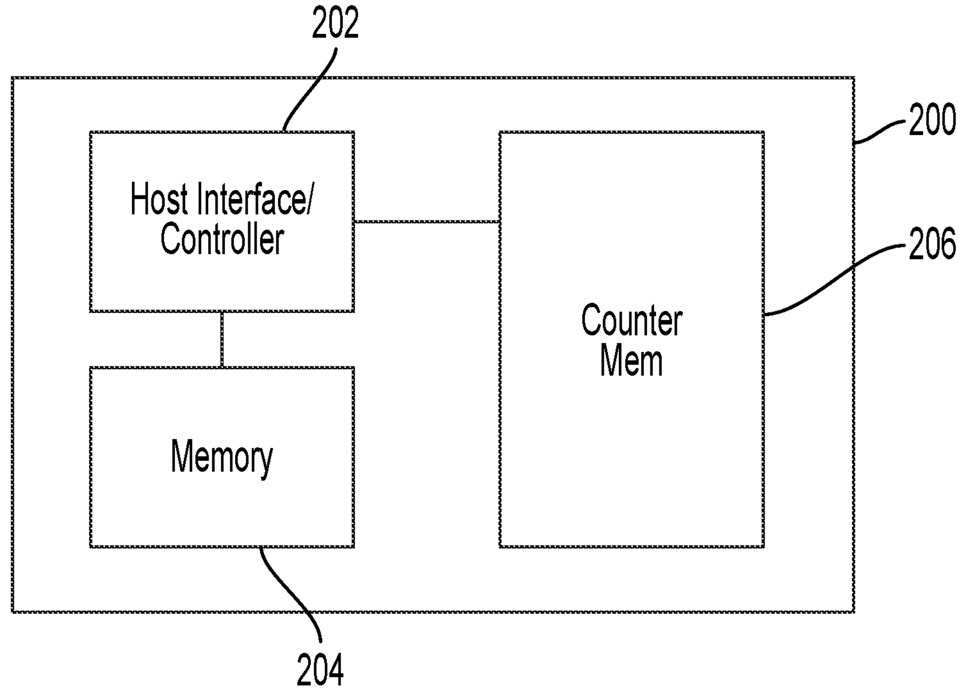
FIG. 2 depicts a block diagram of a memory device according to one or more embodiments.

FIG. 2 depicts a block diagram of a memory device 200 according to one or more embodiments. The memory device 200 may be similar to the memory device 102 of FIG. 1. In some embodiments, the memory device 200 includes a host interface and controller (collectively referred to as a host interface) 202, storage memory 204, and counter memory 206. The host interface 202 may be configured to exchange commands and/or data with the RC interface 112 over the interface connections 106. In some embodiments, the host interface 202 may include an associated software layer to manage the physical connector of the interface connections. The host interface 202 may respond to data access requests (e.g., load and store requests) received from the host 100 over the interface connection 106. The host interface 202 may also respond to commands from the host to access counter information stored in the counter memory 206.

The host interface 202 may also control and provide access to and from the storage memory 204 and counter memory 206. In this regard, the host interface 202 may include at least one processor for interfacing with the host 100 and the memory components 204, 206. The processor may include, for example, a digital circuit (e.g., a micro-controller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory 204 and counter memory 206. For example, the data access instructions may correspond to data access requests to the storage memory, and may include any suitable data storage and retrieval algorithm (e.g., load, store, and/or flush) instructions, and/or the like.

In some embodiments, the host interface 202 loads or stores data from or to the storage memory 204 in response to a data access request. In some embodiments, the data access further triggers the host interface 202 to increase a counter in the counter memory 206 for the accessed memory address. By maintaining the counter in the memory device 200 itself, accesses to the memory addresses of the memory device may be maintained without involvement of, for example, the host processor 105, and without triggering page faults.

In some embodiments, the counter memory 206 maintains a first counter for a first portion of the storage memory 204, and a second counter for a second portion of the storage memory 204. The first and second portions may be of a particular size that may correspond, for example, to the size of a memory page (e.g., 4 KB). The first and second counters may be implemented using any data structure as will be appreciated by a person of skill in the art such as, for example, arrays, linked lists, queues, trees, and/or the like. In some embodiments, the counter includes a range of memory addresses associated with the counter, a count value indicative of a number of memory accesses to the memory addresses, a process identifier (ID), and/or the like.

In some embodiments, the storage memory 204 stores data accessed by the host 100 in one or more memory addresses. Data (e.g., a memory page) stored in the storage memory 204 may be promoted and demoted in and out of the storage memory 204 in response to instructions from the host 100.

In some embodiments, the host 100 interfaces with the host interface 202 for transmitting commands for the counter memory 204. For example, the host 100 may transmit (e.g., through the RC interface 112) a command to retrieve count values associated with specific memory addresses, all memory addresses, specific processes, all processes, and/or the like. For example, the host 100 may transmit a command to retrieve one or more access counts in response to determining that a promotion or demotion of a memory page that is stored in the storage memory 204 is desirable. Promotion may be desirable, for example, if a higher-tiered memory device 102 has available storage space. The host interface 202 may receive the command from the host 100 and interface with the counter memory 206 to retrieve the requested access counts. The host 100 may implement a page demotion or promotion based on the received counts. For example, the host 100 may transmit a signal to the host interface 202 to cause the promotion (e.g., to the main memory 104) of one or more memory pages with the highest memory counts. In another example, the host 100 may transmit a signal to the host interface 202 to cause the demotion (e.g., to a lower-tiered memory device 102) of one or more memory pages with the lowest memory counts. The host may further transmit a signal to the device from where a memory page is being moved, to reset the corresponding counter memory 206.

The host 100 may also transmit a command to reset one or more of the counters in the counter memory 206. For example, the host 100 may transmit a command to reset all the counters, or specific counters. The reset command may be transmitted by the host 100 in response to rebooting the system, initialization of the memory device 200, execution of a new application, and/or the like. In some embodiments, the reset command may be transmitted on a periodic (e.g., regular or irregular) basis.

Figure 3:
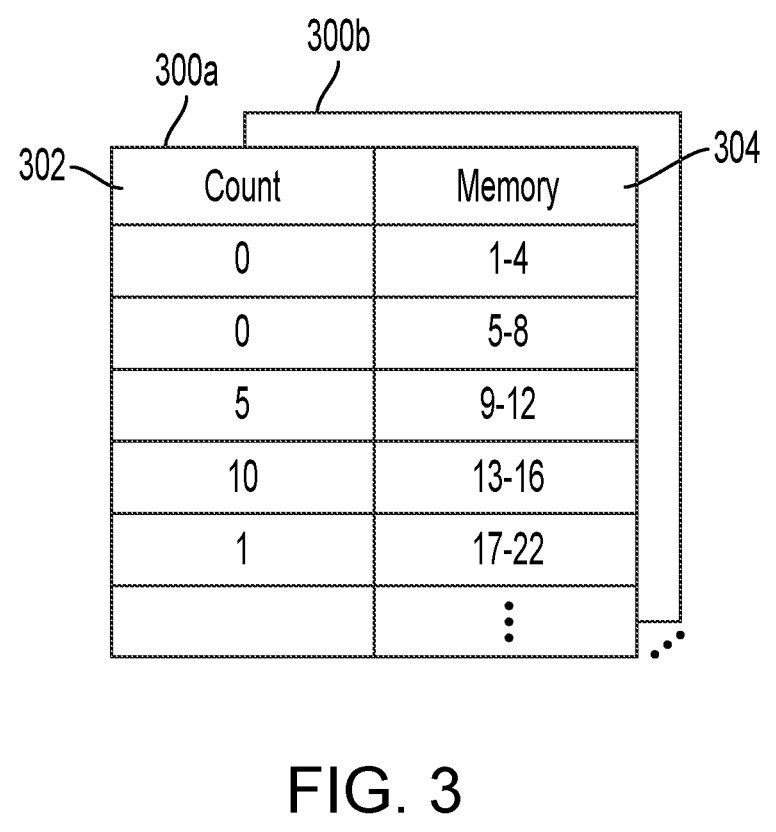

FIG. 3 depicts a conceptual layout diagram of a data structure 300*a*, 300*b* storing one or more access counters according to one or more embodiments. The access counter may include, for example, a count value 302 and a range of memory addresses 304. In some embodiments, the access counters may be grouped based on a process identifier (ID). For example, a first data structure 300*a* may store the access counters for a first process, and a second data structure 300*b* may store the access counters for a second process.

Figure 4:
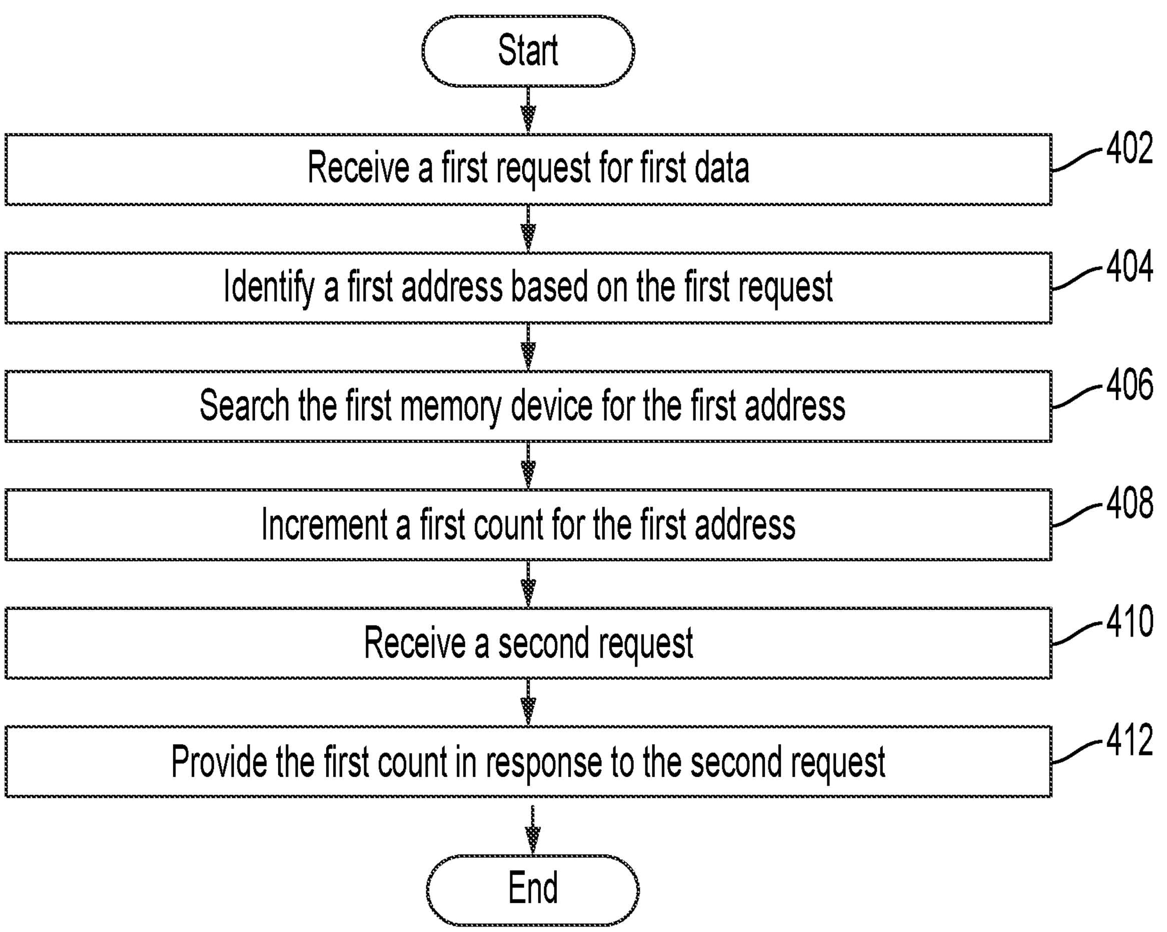
FIG. 4 depicts a flow diagram of a process for handling requests from a host according to one or more embodiments.

FIG. 4 depicts a flow diagram of a process for handling requests from the host 100 according to one or more embodiments. The process starts, and in act 402, the host interface 202 receives a first request for first data from a process running on the host 100. The first request may be, for example a memory access request (e.g., a load or store request). The RC interface 112 may generate appropriate data packets (e.g., CXL packets) and transmit the data packets over the interface connection 106 (e.g., a CXL interface).

The host interface 202 may receive the request packets and identify, in act 404, a first memory address in the storage memory 204.

In act 406, the host interface 202 searches the first storage memory 204 for the first memory address, and accesses the address for executing a requested action. For example, the host interface 202 may load data, store data, or flush data in the first memory address.

In act 408, the host interface 202 identifies a counter associated with the first memory address, and increments a count value (e.g., a first count) of the counter.

In act 410, the host interface 202 receives a second request from the host. The second request may be, for example, a request to access the count values of one or more counters.

In act 412, the host interface 202 provides the access count value(s) (e.g., the first count) to the requesting host 100 over the interface connection 106. In some embodiments, the memory manager 124 may take an action in response to the count value(s). For example, the memory manager 124 may execute promotion and/or demotion of one or more pages (e.g., the first data) based on the access count values. For example, the memory manager 124 may determine (e.g., based on a comparison) that the first data has a number of accesses that is lower than the number of accesses of another data, and should therefore be moved to a storage of a lower memory tier (e.g., a second memory device). In some embodiments, other actions may be triggered based on the access count values, such as, for example, one or more performance related decisions.

Figure 5:
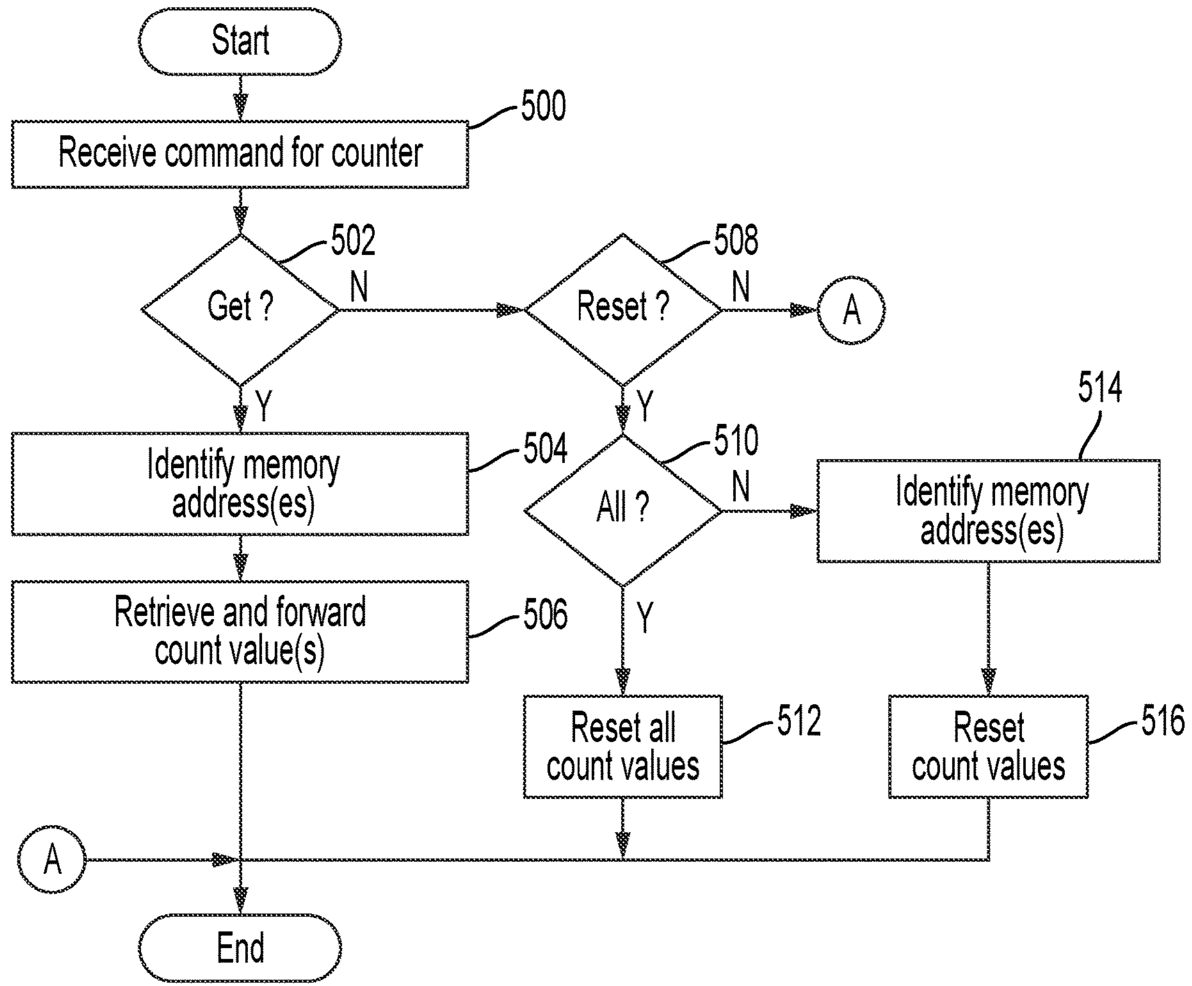
FIG. 5 depicts a flow diagram of a process for handling commands directed to a counter memory according to one or more embodiments.

FIG. 5 depicts a flow diagram of a process for handling commands directed to the counter memory 206 according to one or more embodiments. In act 500, the host interface 202 receives a command transmitted by the host 100 using a command interface (e.g., a CXL interface). The command may be generated, for example, by the memory manager 124. The command generated by the memory manager may include, for example, a logical address and a process ID. The host processor 105 may receive the generated command and translate the logical address into a physical address for the process ID. The command with the translated physical address may be transmitted by the RC interface 202 via the interface connection 106.

In act 502, the host interface 202 processes the command and determines whether the command is a command to retrieve (or get) count values from the counter memory 206.

If the answer is YES, the host interface 202 identifies information in the command to retrieve the appropriate count values. For example, the host interface may identify one or more memory addresses for which count values are requested.

In act 506, the host interface 202 retrieves from the counter memory 206 the count value(s) of the counter(s) associated with the memory address(es), and forwards the retrieved value(s) to the host 100.

Referring again to act 502, the host interface 202 determines whether the command from the host 100 is for resetting one or more of the count values. If the answer is YES, the host interface 202 determines, in act 510, whether the reset command is directed to all the counters. If the answer is YES, the host interface transmits a signal to the counter memory 206 to reset the count values of the counters to 0.

If the reset command is not directed to all the counters, the host interface 202 identifies the appropriate counter(s) to reset based on the memory addresses(s) in the command.

In act 516, the host interface 202 resets the count value(s) of the counter identified by the memory addresses(s).

Figure 6:
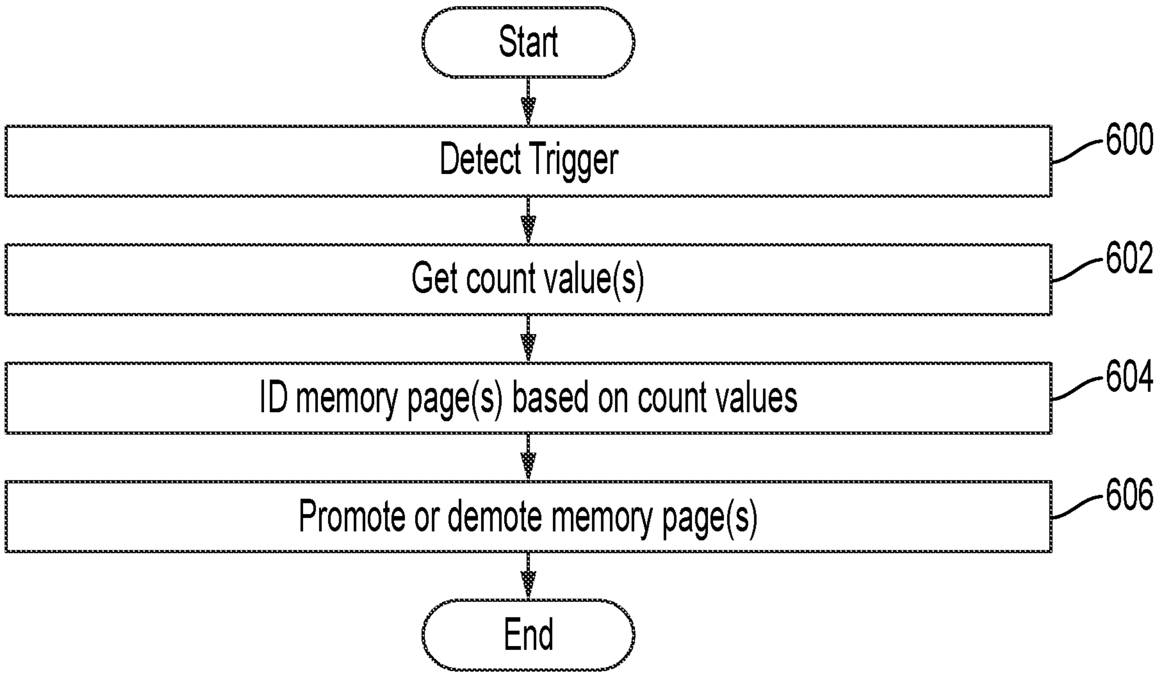
FIG. 6 depicts a flow diagram of a process for managing data stored in a storage system according to one or more embodiments.

FIG. 6 depicts a flow diagram of a process for managing data stored in the storage system according to one or more embodiments. The process may be executed, for example, by the memory manager 124 of the host 100.

The process starts, and in act 600, the memory manager 124 detects a trigger for obtaining access counts from one or more memory devices 106. The trigger may be, for example, passage of a particular amount of time, a determination of available memory space for promotion and/or demotion, and/or the like.

In act 602, the memory manager 124 transmits a command to retrieve one or more count values. For example, the memory manager 124 may transmit a command to retrieve the count values associated with a particular process and/or memory addresses.

In act 604, the memory manager 124 identifies memory pages that should be demoted and/or promoted based on the count values. For example, the memory manager 124 may identify one or more memory pages with a highest access count for being promoted to a higher tiered memory device. In another example, the memory manager 124 may identify one or more memory pages with a lowest access count for being demoted to a lower tiered memory device.

In act 606 the memory manager transmits a signal for moving the identified memory pages from a current memory device to another memory device. For example, the host 100 may load the memory pages from the current memory device and store the pages to the other memory device. The host 100 may then clear the read memory address in the current memory device. In some embodiments, the translation table 110 may be updated to reflect the new memory address(es) of the memory page(s) that have been moved.

One or more embodiments of the present disclosure may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for on-demand data storage management have been specifically described and illustrated herein, many modifications and variations will be apparent to those skilled in the art. Accordingly, it is to be understood that systems and methods for on-demand data storage management constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1: A storage system comprising: a first memory device; a second memory device; and a controller configured to communicate with the first memory device and the second memory device, the controller being configured to: receive, from a process running on a computing device, a first request for first data; identify a first address based on the first request; search the first memory device for the first address; modify a first count in the second memory device for the first address; receive from the computing device a second request; and provide the first count in response to the second request.

Statement 2: The storage system of Statement 1, wherein the first memory device is associated with a first access latency.

Statement 3: The storage system of Statement 1, wherein the first memory device is coupled to the computing device over a communication interface.

Statement 4: The storage system of Statement 1, wherein the first request includes at least one of a request to load or store the first data.

Statement 5: The storage system of Statement 1, wherein the first count is indicative of a number of accesses to the first address.

Statement 6: The storage system of Statement 1, wherein the second memory device is configured to maintain a second count for a second address in the first memory device.

Statement 7: The storage system of Statement 6, wherein the controller is configured to provide the second count in response to the second request.

Statement 8: The storage system of Statement 7, wherein the computing device is configured to: compare the first count to the second count; and cause an action in response to the compare.

Statement 9: The storage system of Statement 8, wherein the first count is greater than the second count, and the computing device is configured to maintain second data associated with the second address in the first memory device based on the compare.

Statement 10: The storage system of Statement 1, wherein the first count is maintained in association with a process of the computing device.

Statement 11: The storage system of Statement 1, wherein the controller is further configured to: receive from the computing device a third request from the computing device; and update the first count in response to the third request.

Statement 12: A method comprising: receiving, from a process running on a computing device, a first request for first data; identifying a first address based on the first request; searching a first memory device for the first address; modifying a first count in a second memory device for the first address; receiving from the computing device a second request; and providing the first count in response to the second request.

Statement 13: The method of Statement 12 wherein the first memory device is associated with a first access latency.

Statement 14: The method of Statement 12, wherein the first memory device is coupled to the computing device over a communication interface.

Statement 15: The method of Statement 12, wherein the first request includes at least one of a request to load or store the first data.

Statement 16: The method of Statement 12, wherein the first count is indicative of a number of accesses to the first address.

Statement 17: The method of Statement 12 further comprising: maintaining, by the second memory device, a second count for a second address in the first memory device.

Statement 18: The method of Statement 17 further comprising: providing, by the controller, the second count in response to the second request.

Statement 19: The method of Statement 18 further comprising: comparing, by the computing device, the first count to the second count; and causing an action in response to the comparing.

Statement 20: The method of Statement 19, wherein the first count is greater than the second count, the method further comprising: maintaining second data associated with the second address in the first memory device based on the comparing.

What is claimed is:

1. A storage system comprising:

a first memory device;

a second memory device; and a controller configured to communicate with the first memory device and the second memory device, the controller being configured to:

receive, from a computing device, a first request for first data, the first request including a first process identifier associated with a first process, wherein the first request is generated according to a compute express link memory (CXL.mem) protocol;

identify a first address based on the first request;

search the first memory device for the first address;

modify a first count in the second memory device for the first address, wherein the first count is stored in association with the first process identifier;

receive from the computing device a second request, wherein the second request is generated according to the CXL.mem protocol, the second request includes information of the first address and the first process identifier; and provide the first count based on the information of the first address and the first process identifier.

2. The storage system of claim 1, wherein the first memory device is associated with a first access latency.

3. The storage system of claim 1, wherein the first memory device is coupled to the computing device over a communication interface.

4. The storage system of claim 1, wherein the first request includes at least one of a request to load or store the first data.

5. The storage system of claim 1, wherein the first count is indicative of a number of accesses to the first address.

6. The storage system of claim 1, wherein the second memory device is configured to maintain a third count for a second address in the first memory device.

7. The storage system of claim 6, wherein the controller is configured to provide the third count in response to the second request.

8. The storage system of claim 7, wherein the computing device is configured to:

compare the first count to the third count; and cause an action in response to the compare.

9. The storage system of claim 8, wherein the first count is greater than the third count, and the computing device is configured to maintain second data, associated with the second address, in the first memory device based on the compare.

10. The storage system of claim 1, wherein the controller is further configured to:

receive from the computing device a third request from the computing device; and update the first count in response to the third request.

11. A method comprising:

receiving, from a process running on a computing device, a first request for first data, the first request including a first process identifier associated with a first process, wherein the first request is generated according to a compute express link memory (CXL.mem) protocol;

identifying a first address based on the first request;

searching a first memory device for the first address;

modifying a first count in a second memory device for the first address, wherein the first count is stored in association with the first process identifier;

receiving from the computing device a second request, wherein the second request is generated according to the CXL.mem protocol, the second request includes information of the first address and the first process identifier; and providing the first count based on the information of the first address and the first process identifier.

12. The method of claim 11, wherein the first memory device is associated with a first access latency.

13. The method of claim 11, wherein the first memory device is coupled to the computing device over a communication interface.

14. The method of claim 11, wherein the first request includes at least one of a request to load or store the first data.

15. The method of claim 11, wherein the first count is indicative of a number of accesses to the first address.

16. The method of claim 11 further comprising:

maintaining, by the second memory device, a third count for a second address in the first memory device.

17. The method of claim 16 further comprising:

providing the third count in response to the second request.

18. The method of claim 17 further comprising:

comparing, by the computing device, the first count to the third count; and causing an action in response to the comparing.

19. The method of claim 18, wherein the first count is greater than the third count, the method further comprising:

maintaining second data, associated with the second address, in the first memory device based on the comparing.

* * * * *